(12) United States Patent
Benisty et al.

(10) Patent No.: US 11,941,295 B2
(45) Date of Patent: Mar. 26, 2024

(54) DATA STORAGE DEVICE AND METHOD FOR PROVIDING AN ADAPTIVE DATA PATH

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 144 days.

(21) Appl. No.: 17/572,917

(22) Filed: Jan. 11, 2022

(65) Prior Publication Data

US 2023/0221889 A1 Jul. 13, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0635; G06F 3/061
See application file for complete search history.

(56) References Cited

U.S. PATENT DOCUMENTS

| | | | |
|---|---|---|---|
| 5,828,860 A | 10/1998 | Miyaoku et al. | |
| 10,120,832 B2 | 11/2018 | Raindel et al. | |
| 10,725,825 B2 | 7/2020 | Sindhu et al. | |
| 11,403,082 B1* | 8/2022 | Mehta | G06F 8/452 |
| 2015/0199274 A1* | 7/2015 | Klein | G06F 12/0831 711/146 |
| 2016/0077976 A1* | 3/2016 | Raikin | G06F 13/28 711/207 |
| 2016/0291878 A1 | 10/2016 | Kang | |
| 2017/0083252 A1 | 3/2017 | Singh et al. | |
| 2019/0187894 A1 | 6/2019 | Benisty | |
| 2020/0012604 A1 | 1/2020 | Agarwal | |
| 2020/0050402 A1 | 2/2020 | Furey et al. | |
| 2020/0065024 A1* | 2/2020 | Park | G06F 3/0688 |
| 2021/0117333 A1* | 4/2021 | Qureshi | G06F 12/0246 |
| 2021/0181948 A1 | 6/2021 | Stabrawa et al. | |
| 2021/0374079 A1* | 12/2021 | Shin | G06F 13/382 |
| 2022/0066822 A1* | 3/2022 | Patel | G06F 9/505 |

(Continued)

OTHER PUBLICATIONS

International Search Report dated Nov. 1, 2022 for International Application No. PCT/US2022/029741.

(Continued)

*Primary Examiner* — Michelle T Bechtold
*Assistant Examiner* — Tong B. Vo
(74) *Attorney, Agent, or Firm* — Crowell & Moring LLP

(57) ABSTRACT

A data storage device and method for providing an adaptive data path are disclosed. In one embodiment, a data storage device is in communication with a host comprising a first processor (e.g., a graphics processing unit (GPU)), a second processor (e.g., a central processing unit (CPU)), and a queue. The data storage device chooses a data path to use to communicate with the queue based on whether the queue is associated with the first processor or with the second processor. Other embodiments are possible, and each of the embodiments can be used alone or together in combination.

20 Claims, 10 Drawing Sheets

(56) References Cited

U.S. PATENT DOCUMENTS

| | | | |
|---|---|---|---|
| 2022/0229787 A1* | 7/2022 | Veluswamy | G06F 13/1668 |
| 2022/0308764 A1* | 9/2022 | Pismenny | G06F 3/061 |
| 2023/0205700 A1* | 6/2023 | Nakra | G06F 12/084 |
| | | | 711/137 |
| 2023/0205705 A1* | 6/2023 | Poremba | G06F 12/10 |
| | | | 711/203 |

OTHER PUBLICATIONS

Written Opinion dated Nov. 1, 2022 for International Application No. PCT/US2022/029741.

NVIDIA Developer, "GPUDirect Storage: A Direct Path Between Storage and GPU Memory"; NVIDIA Technical Blog; retrieved from the Internet on Oct. 10, 2022 at https://developer.nvidia.com/blog/gpudirect-storage/; pp. 1-8; Aug. 6, 2019.

Thompson, A. et al.; "GPUDirect Storage: A Direct Path Between Storage and GPU Memory"; Developer Blog, Technical Walkthrough; NVIDIA Corporation; downloaded from the Internet on Jan. 10, 2022 at https://developer.nvidia.com/blog/gpudirect-storage/; Aug. 6, 2019; 7 pages.

* cited by examiner

DATA STORAGE DEVICE AND METHOD FOR PROVIDING AN ADAPTIVE DATA PATH

BACKGROUND

A host can write data to and read data from a data storage device. Some hosts have one or more graphics processing units (GPUs) in addition to a central processing unit (CPU). GPUs can be useful when the host runs applications related to artificial intelligence (AI) or high-performance computing (HPC), for example. The datasets read from the data storage device in such applications can be very large and lead to bottlenecks.

DETAILED DESCRIPTION

Overview

Figure 1A:
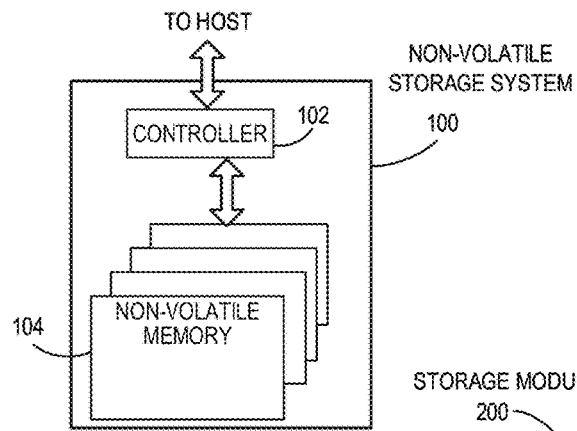
FIG. 1A is a block diagram of a data storage device of an embodiment.

By way of introduction, the below embodiments relate to a data storage device and method for providing an adaptive data path. In one embodiment, a data storage device is provided comprising, an interface, a memory, and a controller. The interface is configured to communicate with a host comprising a central processing unit (CPU), a graphics processing unit (GPU), and a plurality of submission queues. The controller is configured to classify each of the plurality of submission queues as either a CPU queue or a GPU queue; and determine a data path for a transmission to one of the plurality of submission queues based on whether the one of the plurality of submission queues is classified as a CPU queue or as a GPU queue.

In some embodiments, each of the plurality of submission queues is classified by its address range.

In some embodiments, each of the plurality of submission queues is classified by its creation time.

In some embodiments, the host comprises at least one additional GPU, each with its own data path to the data storage device.

In some embodiments, there are more switches in a data path from the data storage device to the GPU than there are in a data path from the data storage device to the CPU.

In some embodiments, a first data path is used in response to the one of the plurality of submission queues being classified as a CPU queue; a second data path is used in response to the one of the plurality of submission queues being classified as a GPU queue; and the first and second data paths have different latency and/or throughput attributes.

In some embodiments, the transmission relates to command fetching, physical region pages (PRP) fetching, scatter gather lists (SGL) fetching, data transfer, completion posting, and/or interrupt posting.

In some embodiments, the controller is further configured to determine a maximum packet size based on whether the one of the plurality of submission queues is classified as a CPU queue or as a GPU queue.

In some embodiments, the controller is further configured to determine a maximum read request size based on whether the one of the plurality of submission queues is classified as a CPU queue or as a GPU queue.

In some embodiments, the controller is further configured to determine a maximum number of outstanding transactions to issue based on whether the one of the plurality of submission queues is classified as a CPU queue or as a GPU queue.

In some embodiments, the controller is further configured to associate a request from a direct memory access (DMA) engine with the one of the plurality of submission queues.

In some embodiments, the memory comprises a three-dimensional memory.

In another embodiment, a method is provided that is performed in a data storage device in communication with a host comprising a first processor, a second processor, and a queue. The method comprises determining whether the queue is associated with the first processor or with the second processor; in response to determining that the queue is associated with the first processor, selecting a first data path to the queue; and in response to determining that the queue is associated with the second processor, selecting a second data path to the queue, wherein the first and second data paths have different latency and/or throughput attributes.

In some embodiments, the first processor comprises a graphics processing unit (GPU) and the second processor comprises a central processing unit (CPU).

In some embodiments, the determination is made based on an address range of the queue.

In some embodiments, the determination is made based on a creation time of the queue.

In some embodiments, the method further comprises sending a transmission on the selected data path, wherein the transmission relates to command fetching, physical region pages (PRP) fetching, scatter gather lists (SGL) fetching, data transfer, completion posting, and/or interrupt posting.

In some embodiments, the method further comprises determining a maximum packet size, a maximum read request size, and/or a maximum number of outstanding transactions to issue based on whether the queue is associated with the first processor or with the second processor.

In some embodiments, the method further comprises associating a request from a direct memory access (DMA) engine with the queue.

In some embodiments, there are more switches in the first data path than there are in the second data path.

In another embodiment, a data storage device is provided comprising a memory and means for dynamically adapting a data path to a queue in a host based on whether the queue is associated with a first processor or with a second processor in the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
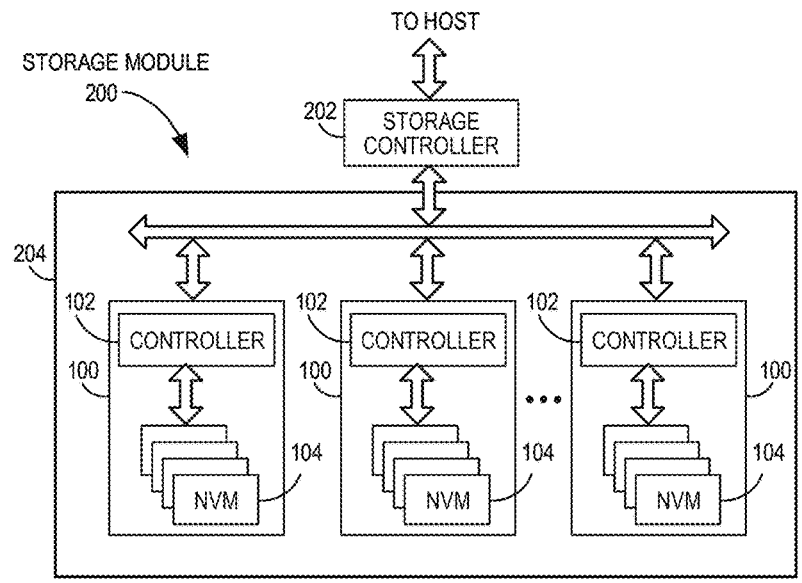
FIG. 1B is a block diagram illustrating a storage module of an embodiment.
Figure 1C:
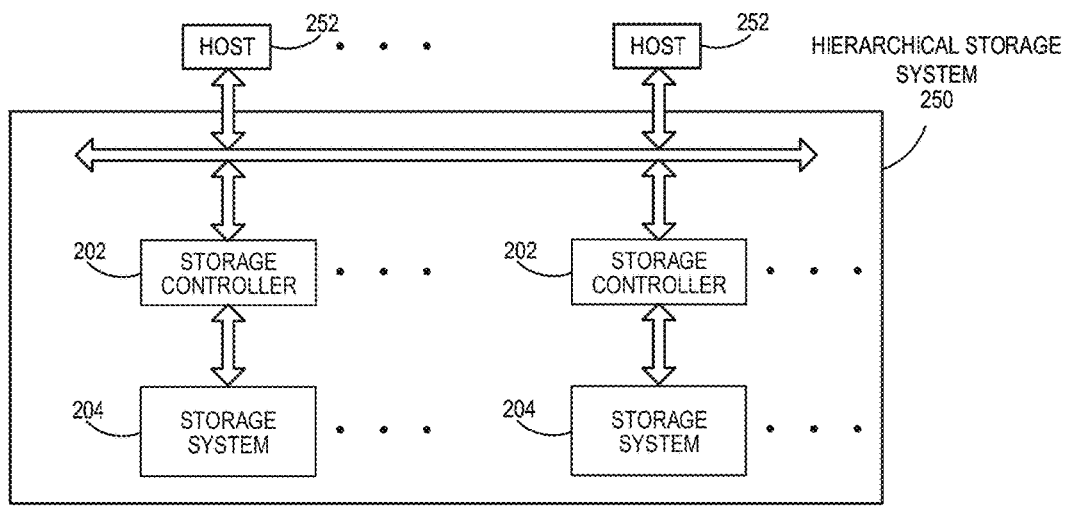
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
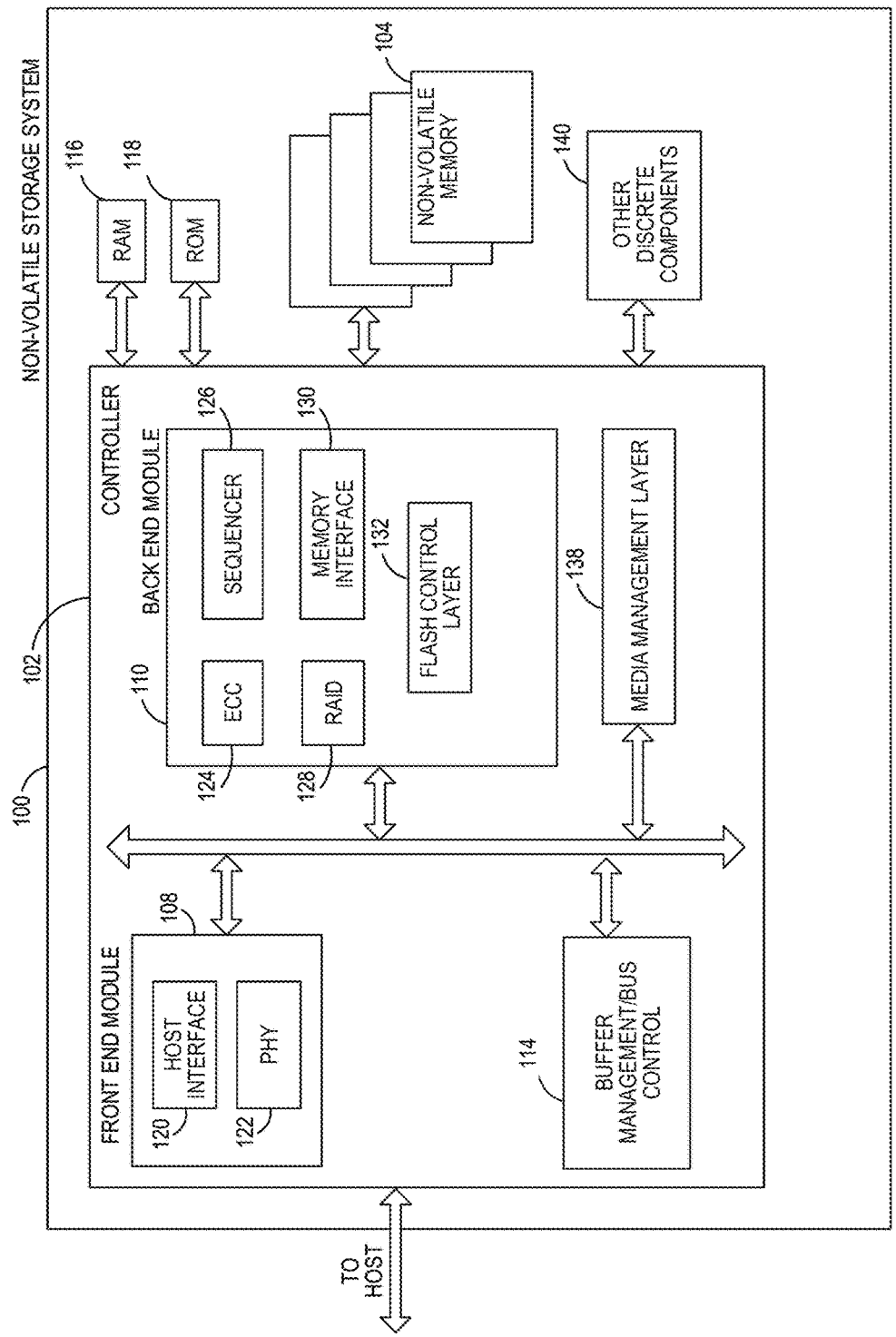
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
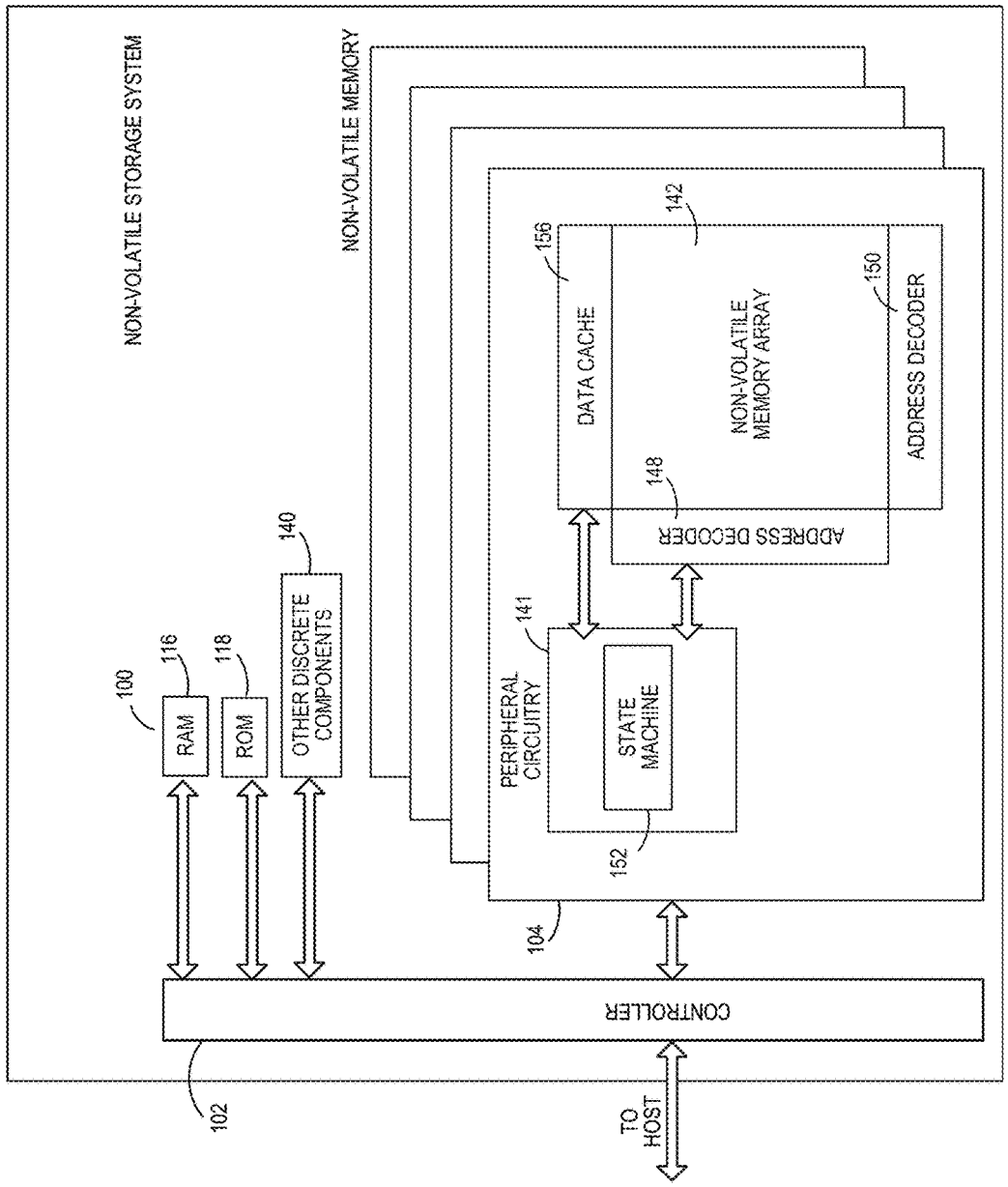
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3A:
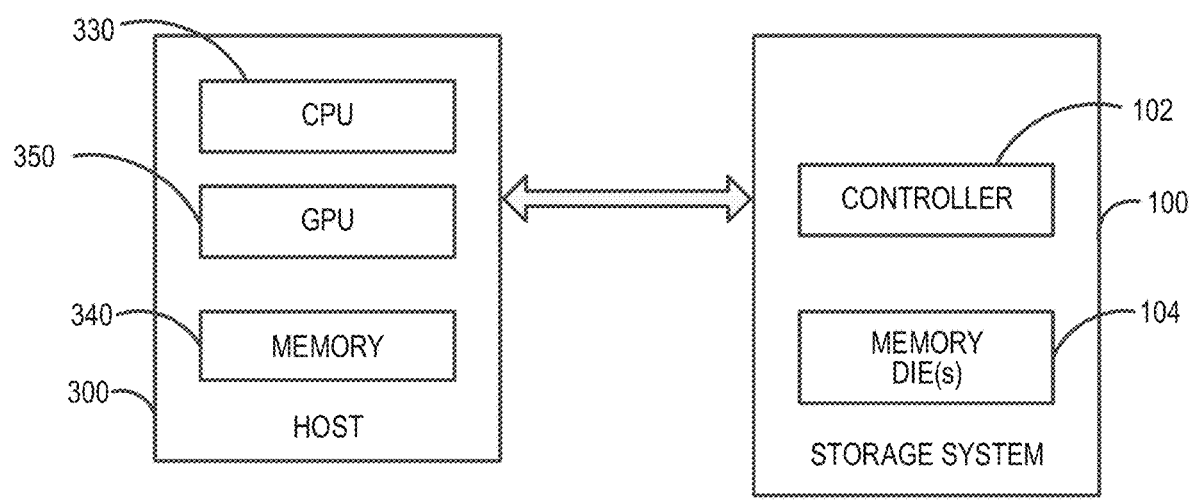
FIGS. 3A and 3B are block diagrams of a host and a data storage device of an embodiment.

Turning again to the drawings, FIG. 3A is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor (here, a central processing unit (CPU)) 330 and a memory 340. In one embodiment, computer-readable program code stored in the host memory 340 configures the CPU 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the data storage device 100 and host 300 operate under the Non-Volatile Memory Express (NVMe) specification. In this embodiment, the memory 340 in the host 300 comprises a submission queue paired with a completion queue. Also, the controller 102 in the data storage device 100 comprises a submission queue tail doorbell register and a completion queue head doorbell register. The operation of these components will be explained below.

NVMe is based on a paired submission and completion queue mechanism. Commands are placed by host software into the submission queue (SQ). Completions are placed into the associated completion queue (CQ) by the controller 102 of the data storage device 100. Submission and completion queues can be allocated in the host memory 340, for example. In one implementation, the submission queues and completion queues may have a 1:1 correlation, and in another implementation, the submission queues and completion queues do not have a 1:1 correlation.

For initialization, the host 300 may notify the data storage device 100 of the submission queue(s) and completion queue(s) by sending information, such as the base address for each queue to the data storage device 100. In that regard, each submission queue has a corresponding completion queue. When the submission queue and the completion queue are resident in the host 300, the host 300 can send information to the data storage device 100 in order for the data storage device 100 to determine the locations of the submission queue and the completion queue in the host 300. In a specific implementation, the host 300 sends a command indicating the creation of the submission queue and the completion queue.

After creating the submission queue(s) and notifying the data storage device 100 about the created submission queue(s), the host 300 can write a command (or several commands) to the submission queue. In one implementation, the data storage device 100 is unaware that the host 300 has updated the submission queue, since the host 300 updated its own memory 340. The host 300 can write to a submission queue tail doorbell register in the data storage device 100 to signal to the data storage device 100 that the host 300 queued one or more commands in this specific submission queue.

After the data storage device is notified of command(s) on the submission queue and before the data storage device 100 fetches the command(s), the data storage device 100 is aware that there are command(s) pending in the submission queue. In the general case, there may be several submission queues (with potentially many pending commands in the several submission queues). Thus, the data storage device controller 102 may arbitrate between the various submission queues to select the particular submission queue from which to fetch the command(s).

Responsive to determining which particular submission queue from which to fetch the command(s), the data storage device 100 fetches the command(s) from the particular submission queue. The data storage device 100 then processes the command (e.g., by parsing the command and determining the steps to execute the command (e.g., read/write/etc.)). After completing the data transfer associated with the command, the data storage device controller 102 sends a completion message to the relevant completion queue. At the initialization phase, the host 300 associates submission queues with completion queues, so that the host 300 is aware of commands that are completed in the submission queue based on which completion queue the data storage device 100 writes to. The completion message may contain information as to the processing of the command(s), such as whether the command was completed successfully or whether there was an error when executing the command.

At this point, the host 300 is unaware that the data storage device 100 posted to the completion queue. This is due to the data storage device 100 causing data to be written to the completion queue. In that regard, the data storage device 100 can notify the host 300 that there has been an update to the completion queue. In particular, the data storage device 100 posts an interrupt to the host 300. Responsive to receiving the interrupt, the host 300 determines that there are one or more completion entries pending for the host 300 in this completion queue and processes the entries in the completion queue. After the host 300 processes the entries from the completion queue, the host 300 notifies the data storage device 100 of the entries that the host 300 processed from the completion queue. This may be performed by updating a completion queue head doorbell register indicative to the data storage device 100 that the host 300 processed one or more entries from the completion queue. Responsive to updating the completion queue head doorbell register, the data storage device 100 updates the head of the completion queue. Given the new head, the data storage device 100 is aware as to which entries in the completion queue have already been processed by the host 300 and may be overwritten.

Returning to the drawings, FIG. 3A shows that, in one embodiment, the host 300 also comprises a graphics processing unit (GPU) 350. In general, the GPU 350 is configured to accelerate graphics rendering. The GPU 350 can be used to process a plurality of data segments simultaneously, which may be useful in environments such as artificial intelligence (AI), machine learning (ML), high-performance computing (HPC) datasets, and gaming applications. While FIG. 3A shows the GPU 350 as a discrete hardware component separate from the CPU 330, in other embodiments, the GPU 350 is integrated in the CPU 330.

Figure 3B:
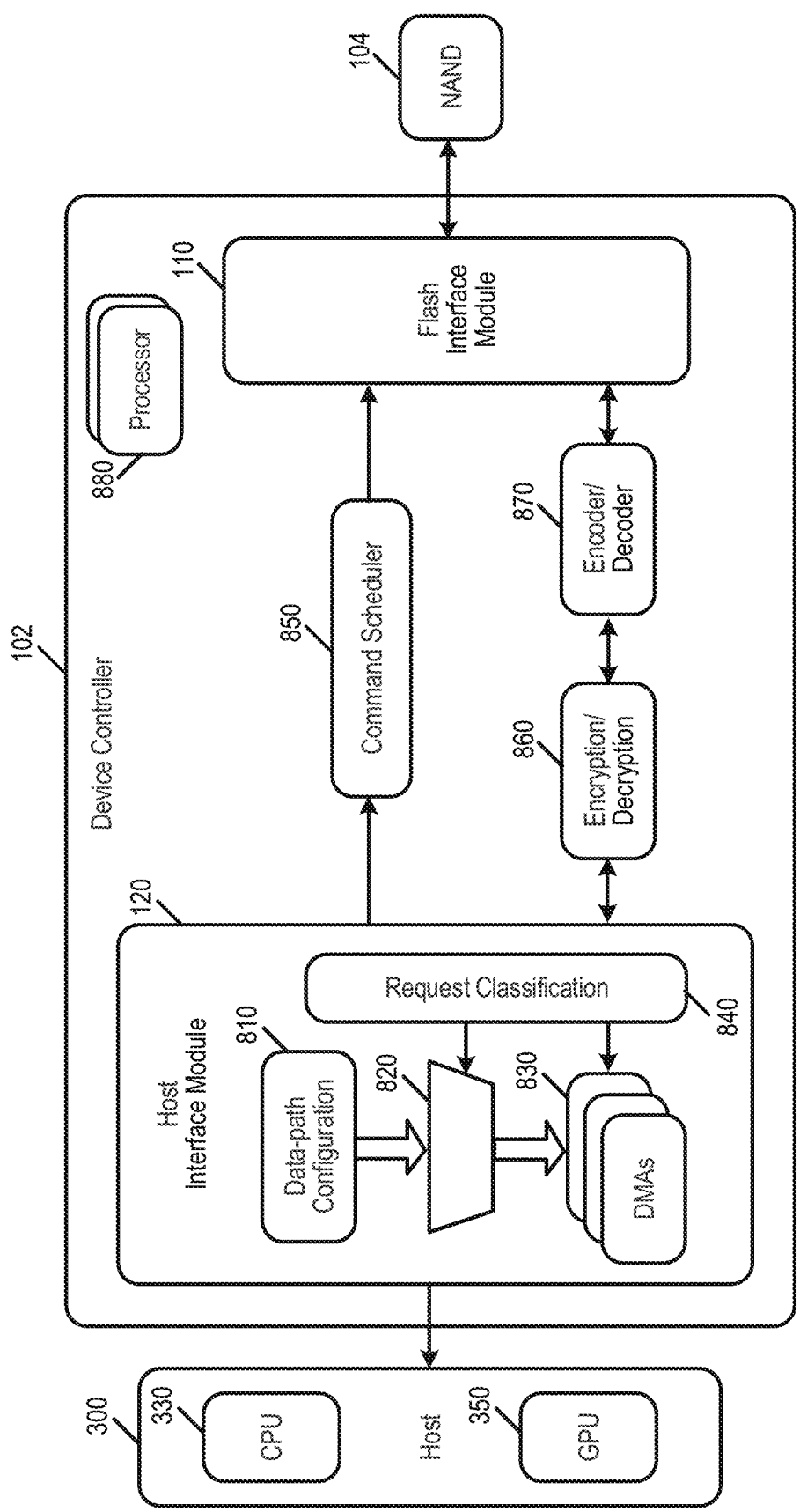

FIG. 3B is a block diagram that shows the host 300 and the data storage device 100 of one embodiment in additional detail. As shown in FIG. 3B, the host 300, which comprises the CPU 330 and GPU 350, is in communication with the host interface module 120 of the controller 102 of the data storage device 100. In this embodiment, the host interface module 120 comprises a data path configuration module 810, a processing module 820, direct memory access (DMA) modules 830, and request classification module 840, which will be described in more detail below and can be used to dynamically adapt a data path to a queue in a host based on whether the queue is associated with a first processor or with a second processor in the host. The controller 102 also comprises a command scheduler 850, an encryption/decryption module 860, an encoder/decoder 870, one or more processors 880, and a flash interface module 110 that is configured to communication with the memory (here, NAND) 104.

Figure 4A:
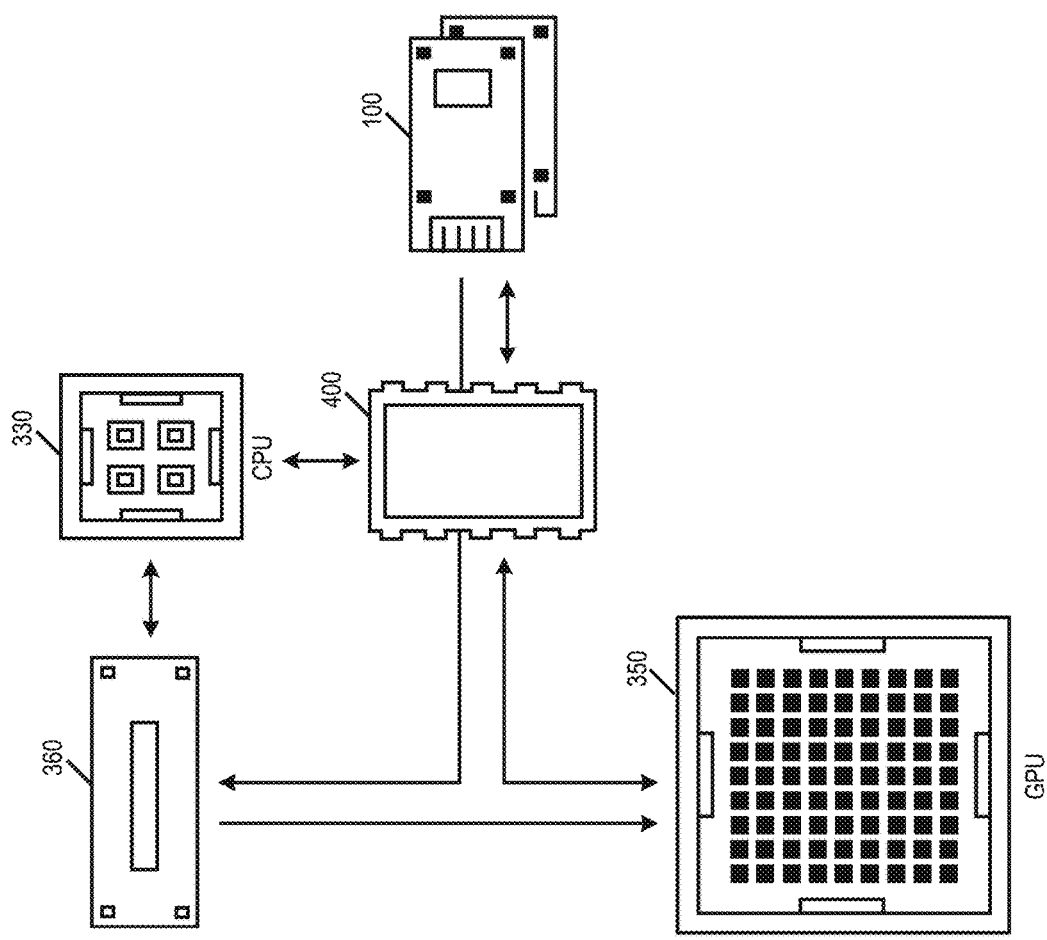
FIGS. 4A and 4B are illustrations of storage environments of embodiments.

FIG. 4A is a block diagram of a storage architecture of an environment. FIG. 4A shows one or more data storage devices 100 (e.g., NVMe devices) in communication with a switch (e.g., a PCIe switch) 400 in the host 300. The switch 400 is also in communication with the host's CPU 330, GPU 350, and memory 360. In this architecture, the host's CPU 330 reads data from the data storage device 100 into the host's memory 360 and then transfers the data to the host's GPU 350.

As artificial intelligence (AI) and high-performance computing (HPC) datasets continue to increase in size, the time spent loading data for a given application begins to place a strain on the application's total performance. When considering end-to-end application performance, fast GPUs are increasingly starved by the process of loading data from the data storage device 100 to the GPU 350 for processing. This input/output (I/O) process has historically been controlled by the CPU 330. However, as computation shifts from slower CPUs to faster GPUs, I/O becomes more of a bottleneck to overall application performance.

Figure 4B:
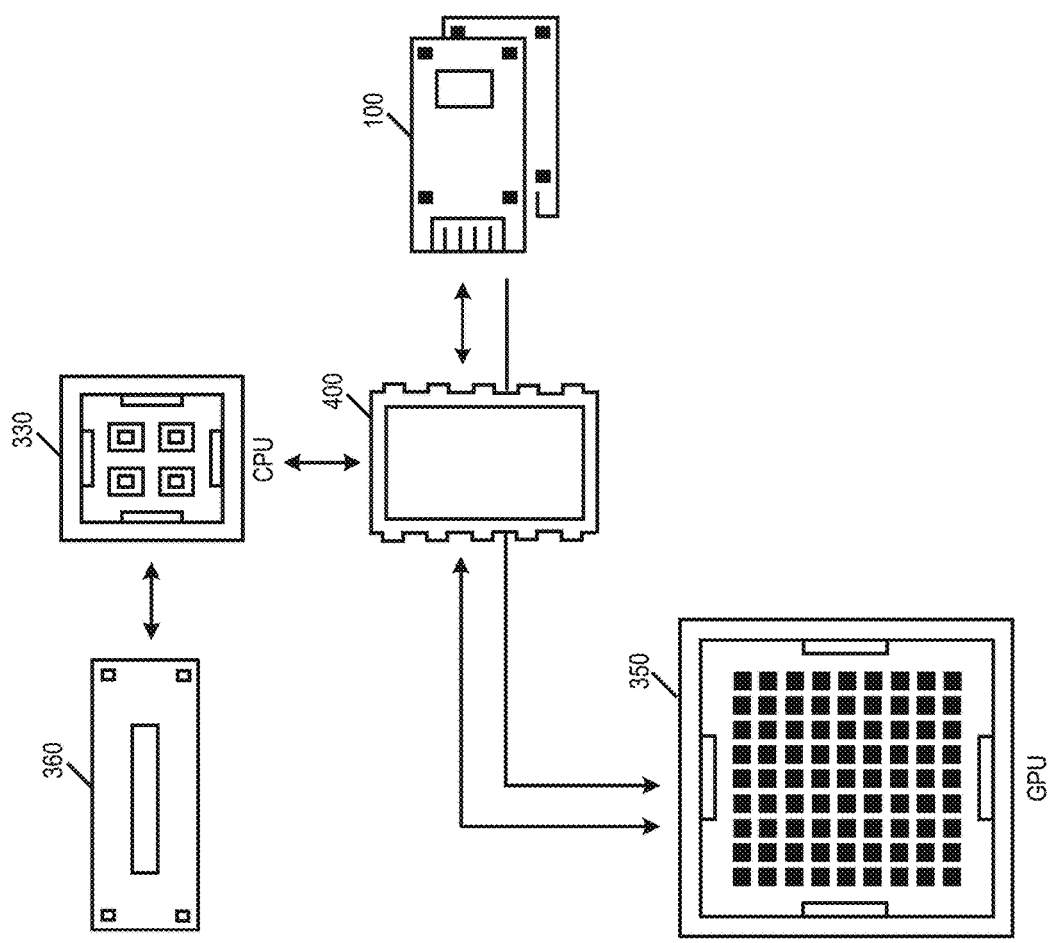

A new technology called GPUDirect® Storage addresses this issue by enabling a direct data path between local or remote storage, like NVMe or NVMe over Fabric (NVMe-oF), and the GPU. This architecture is shown in FIG. 4B. As shown in FIG. 4B, GPUDirect® Storage avoids extra copies through a bounce buffer in the CPU's memory and enables a direct memory access (DMA) engine to move data on a direct path into or out of the GPU 350—all without burdening the CPU 330 or GPU 350. This architecture results in a direct data path from the data storage device 100 to the GPU 350, which provides higher bandwidth by skipping the CPU 330 altogether.

Figure 5:
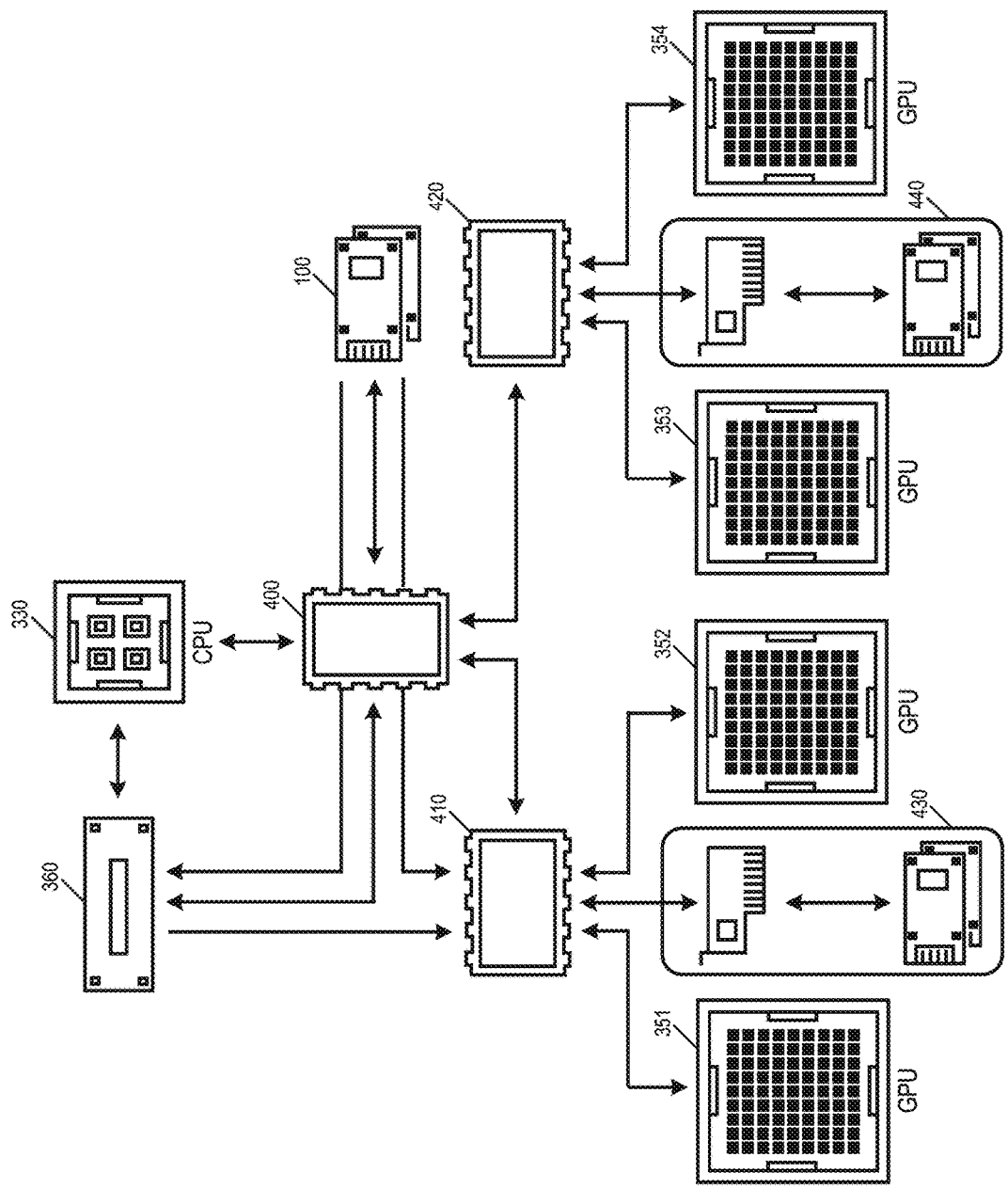
FIG. 5 is an illustration of a storage environment of an embodiment.

One common theme between data analytics and AI is that the datasets used to derive insights are often massive and lead to a scaled storage environment, such as the one illustrated in FIG. 5. As shown in FIG. 5, the host 300 comprises a plurality of GPUs 351, 352, 353, 354 instead of just one GPU 350 as in FIGS. 4A and 4B. Also, in addition to the data storage device 100, a redundant array of independent drives (RAID) 430, 440 (each with its own set of data storage devices and a network interface card) are used to store data and provide it to the GPUs 351, 352, 353, 354.

In this environment, there are multiple paths for transferring the data. When read commands are queued by the CPU 330, the storage system's controller 102 needs to access the data stored in the host's system memory 360, and, for that, it needs to pass through a single PCIe switch 400. On the other hand, when commands are queued by one of the GPUs 351, 352, 353, 354, the storage system's controller 102 needs to access the data stored in the GPU's memory, and, for that, it needs to pass through two PCIe switches. This difference significantly influences the data path behavior. More specifically, if the storage system's controller 102 assumes a single data path to access the host's system memory 350, the introduction of GPUDirect® Storage breaks that assumption. This forces the controller 102 to assume the worst-case attributes of the data path and introduce other issues, such as latency and bubbles on the data path. The following embodiments can be used to address this problem of having two separate data paths with having different attributes, such as latency and throughput.

In general, in the following embodiments, the controller 102 is configured to detect that the host 300 includes CPU and GPUs (e.g., that can work in parallel using GPUDirect® Storage). The controller 102 is further configured to detect and classify each submission queue as a CPU queue or a GPU queue. Based on this detection, the controller 102 adapts its data path to (a) associate each PCIe translation layer packet (TLP) with a command and either the CPU or the GPU and (b) adapt the data path accordingly.

Figure 6:
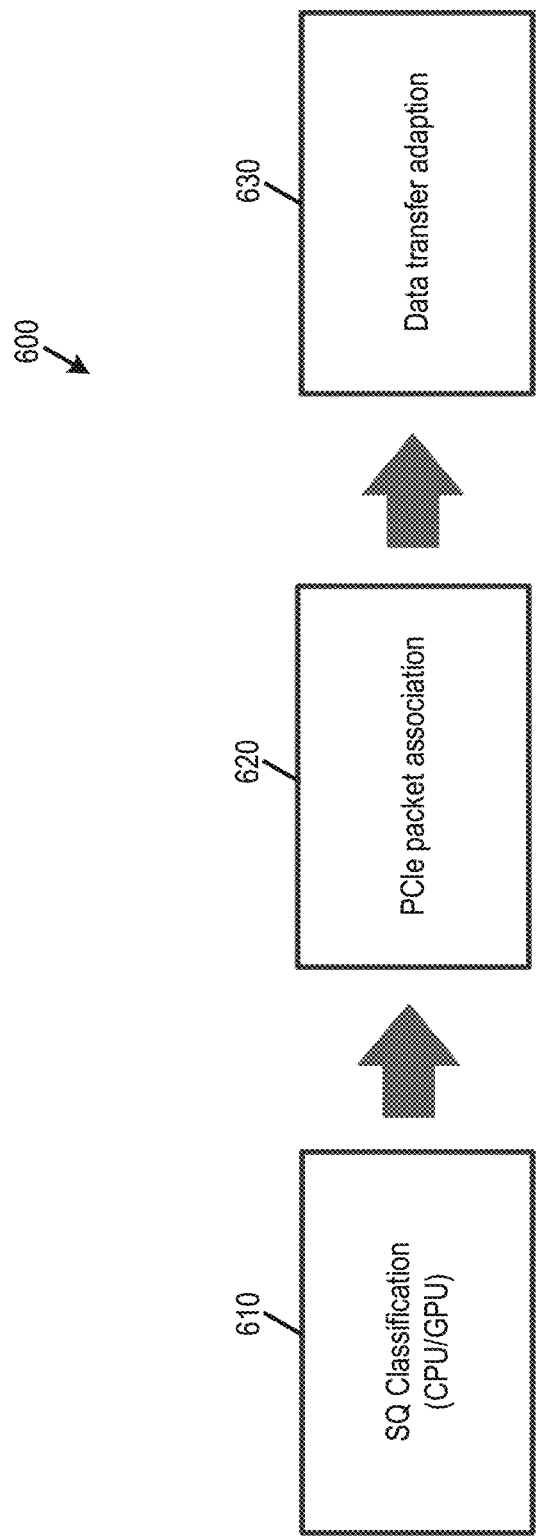
FIG. 6 is a flow chart of a method of an embodiment providing an adaptive data path.

Turning again to the drawings, FIG. 6 shows a flow chart 600 of steps that are performed in one embodiment. As shown in FIG. 6, the controller 102 performs a submission queue (SQ) classification step, in which it detects and classifies each submission queue as being associated with a CPU or GPU (act 610). The classification can be done by either the address range where the submission queue resides or the queue creation time (CPU queues are often created by the host 300 during the initialization sequence, while GPU queues are created later). Then, the controller 102 associates each PCIe/NVMe transaction (e.g., command fetching, physical region pages (PRP)/scatter gather lists (SGL) fetching, data transfer, completion posting, and interrupt posting) with an NVMe command and destination (CPU or GPU) (act 630). Finally, the controller 102 adapts the data path based on the results from the previous steps (act 630). Generally, the controller 102 may have several data path configurations that are changed dynamically based on the current outstanding transactions.

In one embodiment, adapting the data path may include changing the attributes of the TLP, such as maximum packet size and maximum read request size and/or other control fields in the TLP, based on the destination. More specifically, large transactions can incur a latency penalty if there are not a lot of outstanding requests or if there is a transmission failure (which can be a common occurrence in PCIe environments, especially those with long trace lengths, high-speed links, and multiple switches). As such, keeping the packet size to a desired level for each of the target memory areas can be beneficial. In addition, as more transactions are submitted, more responses may occur out of order from the root port. This can increase latency for the specific transactions that a component is waiting for in order to continue a specific operation (e.g., high-latency GPU transactions may block the completion of a relatively-lower-latency CPU-bound command).

In another embodiment, a maximum number of outstanding transactions issued on a PCIe link is adapted based on the destination (e.g., CPU or GPU). Turnaround time of the PCIe link is the time from the data storage device 100 issuing a read request until getting back the data. In order to hide the turnaround time, the data storage device 100 can issue multiple outstanding read requests in parallel. The value of this parameter is selected based on the parameters of the PCIe link and the turnaround time. The higher turnaround time, the more outstanding requests issued by the data storage device 100. This is can be used to hide the turnaround time. That is, when accessing the CPU memory, the transaction crosses a single PCIe switch, whereas the transaction crosses two PCIe switches when accessing the GPU memory. Therefore, more outstanding transactions are required in order to hide the GPU memory latency compared to CPU memory latency. On the other hand, having too many outstanding transactions toward the CPU memory may have other influences such as increasing the latency. The idea is to have more outstanding requests when accessing GPU memory as compared to CPU memory, and this is done adaptively by the controller 102.

In yet another embodiment, each destination may have a dedicated DMA engine 820 (see FIG. 3B) on the data storage device side in order to avoid any impact of performance bottlenecks one destination to another. The DMA engines 820 can work in parallel while each DMA engine utilizes the PCIe bus based on its destination. It should be noted that the data storage device 100 can use separate DMA engines for read and write operations. However, the optimization of the DMA engines is relevant here, as they can be used to separate out transfers to each region and may be tuned in terms of the internal queues and priority assigned to each of the transfers.

Figure 7:
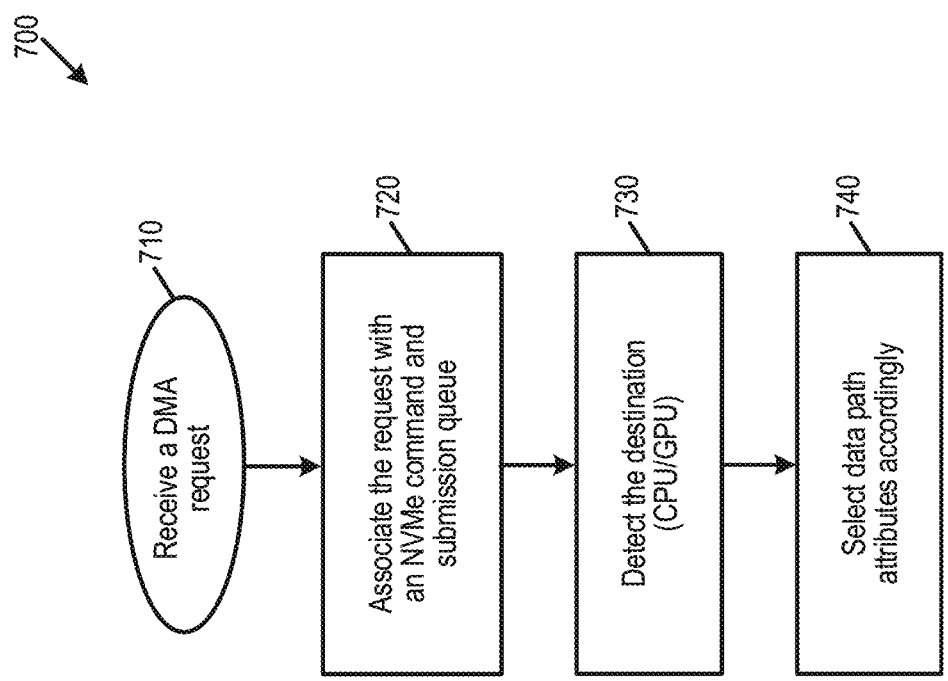
FIG. 7 is a flow chart of a method of an embodiment using direct memory access engines.

FIG. 7 is a flow chart 700 that illustrates this method. As shown in FIG. 7, the controller 102 receives a DMA request (act 710) and associates the request with a command and a submission queue (act 720). The controller 102 then detects the destination (CPU or GPU) (act 730) and selects the data path attributes accordingly (act 740).

In summary, with these embodiments, the controller 102 interacts simultaneously with the host's CPU and GPU while using different access attributes (e.g., access latency) for each. The controller 102 detects requests per submission queue and utilizes the link with different configuration settings based on the destination of each packet. The same approach can apply to the case when having more CPU/GPU/other processors with different attributes and several data path configurations (not only to the case of two data path configurations).

There are several advantages associated with these embodiments. For example, these embodiments can be used to increase performance when working in multi-processor (CPU and GPU) environments, such as with GPUDirect® Storage. With these embodiments, the data path is automatically adapted to the current workload and uses different attributes when interacting with the CPU versus the GPU.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   an interface configured to communicate with a host comprising a central processing unit (CPU), a graphics processing unit (GPU), and a plurality of submission queues;
   a memory; and
   one or more processors configured to communicate with the interface and the memory and further configured to:
      classify each submission queue of the plurality of submission queues as either a CPU queue or a GPU queue;
      determine a data path for a transmission to one submission queue of the plurality of submission queues based on whether the one submission queue is classified as a CPU queue or as a GPU queue; and
      determine a maximum packet size and/or a maximum read request size based on whether the one submission queue is classified as a CPU queue or as a GPU queue.

2. The data storage device of claim 1, wherein each submission queue is classified by its address range.

3. The data storage device of claim 1, wherein the host further comprises at least one additional GPU, each GPU with its own data path to the data storage device.

4. The data storage device of claim 1, wherein there are more switches in a data path from the data storage device to the GPU than there are switches in a data path from the data storage device to the CPU.

5. The data storage device of claim 1, wherein:
   a first data path is used in response to the one submission queue being classified as a CPU queue;
   a second data path is used in response to the one submission queue being classified as a GPU queue; and
   the first and the second data paths have different latency and/or throughput attributes.

6. The data storage device of claim 1, wherein the transmission relates to command fetching, physical region pages (PRP) fetching, scatter gather lists (SGL) fetching, data transfer, completion posting, and/or interrupt posting.

7. The data storage device of claim 1, wherein the one or more processors is further configured to determine a maximum number of outstanding transactions to issue based on whether the one submission queue is classified as a CPU queue or as a GPU queue.

8. The data storage device of claim 1, wherein the one or more processors is further configured to associate a request from a direct memory access (DMA) engine with the one submission queue.

9. The data storage device of claim 1, wherein the memory comprises a three-dimensional memory.

10. The data storage device of claim 1, wherein each submission queue is classified by its creation time.

11. A method comprising:
    performing the following in a data storage device in communication with a host comprising a first processor, a second processor, and a queue:
       determine whether the queue is associated with the first processor or with the second processor;
       in response to determining that the queue is associated with the first processor, select a first data path to the queue;
       in response to determining that the queue is associated with the second processor, select a second data path to the queue, wherein the first and the second data paths have different latency and/or throughput attributes; and
       determine a maximum packet size, a maximum read request size, and/or a maximum number of outstanding transactions to issue based on whether the queue is associated with the first processor or with the second processor.

12. The method of claim 11, wherein the first processor comprises a graphics processing unit (GPU) and the second processor comprises a central processing unit (CPU).

13. The method of claim 11, wherein the determination whether the queue is associated with the first processor or with the second processor is made based on an address range of the queue.

14. The method of claim 11, wherein the determination whether the queue is associated with the first processor or with the second processor is made based on a creation time of the queue.

15. The method of claim 11, further comprising sending a transmission on the selected data path, wherein the transmission relates to command fetching, physical region pages (PRP) fetching, and/or scatter gather lists (SGL) fetching.

16. The method of claim 11, further comprising associating a request from a direct memory access (DMA) engine with the queue.

17. The method of claim 11, wherein there are more switches in the first data path than there are switches in the second data path.

18. The method of claim 11, further comprising sending a transmission on the selected data path, wherein the transmission relates to data transfer.

19. The method of claim 11, further comprising sending a transmission on the selected data path, wherein the transmission relates to completion posting and/or interrupt posting.

20. A data storage device comprising:
    an interface configured to communicate with a host comprising a central processing unit (CPU), a graphics processing unit (GPU), and a plurality of submission queues;
    a memory; and
    means for:
       classifying each submission queue of the plurality of submission queues as either a CPU queue or a GPU queue;
       determining a data path for a transmission to one submission queue of the plurality of submission queues based on whether the one submission queue is classified as a CPU queue or as a GPU queue; and
       determining a maximum number of outstanding transactions to issue based on whether the one submission queue is classified as a CPU queue or as a GPU queue.

* * * * *